United States Patent [19]

Gratzel et al.

[11] 4,382,846

[45] May 10, 1983

[54] SIMULTANEOUS PRODUCTION OF HYDROGEN AND OXYGEN FROM WATER

[75] Inventors: Michael Gratzel, Corsy; John Kiwi, Preverenges; Kuppuswamy Kalyanasundaram, Chavannes, all of Switzerland; John Philp, Longlevens, England

[73] Assignee: Engelhard Corporation, Iselin, N.J.

[21] Appl. No.: 375,913

[22] Filed: May 7, 1982

Related U.S. Application Data

[63] Continuation of Ser. No. 184,460, Sep. 5, 1980.

[30] Foreign Application Priority Data

Aug. 9, 1979 [GB] United Kingdom ................. 7931252
Aug. 7, 1980 [GB] United Kingdom ................. 8022340

[51] Int. Cl.$^3$ ............................................. B01J 19/12
[52] U.S. Cl. ............................................. 204/157.1 R
[58] Field of Search .................. 204/157.1 W; 250/527

[56] References Cited

U.S. PATENT DOCUMENTS 4,105,517  8/1978  Frosch ......................... 204/157.1 W
4,211,621  7/1980  Porter ......................... 204/157.1 W Primary Examiner—Howard S. Williams

[57] ABSTRACT

A method for the simultaneous production of hydrogen and oxygen from water by the visible light irradiation of a water solution containing photosensitizer, an electron relay and a suitable combination of redox catalysts.

30 Claims, No Drawings

SIMULTANEOUS PRODUCTION OF HYDROGEN AND OXYGEN FROM WATER

This is a continuation of application Ser. No. 184,460 filed Sept. 5, 1980.

This invention relates to the simultaneous generation of hydrogen and oxygen from water by photolytic means.

Specifically, this invention relates to a method for the simultaneous evolution of oxygen and hydrogen via the visible light irradiation of water containing a photosensitizer, an electron relay and a suitable combination of redox catalysts.

In this process water is both reduced and oxidized by reducing and oxidizing species which are produced in situ photochemically by visible light irradiation.

This invention represents the first known photochemical method for the visible light induced generation of both hydrogen and oxygen from water absent an electron donor. The system comprises only a sensitizer, two catalysts and an electron acceptor which serves as an electron relay. Accordingly, this process is not only practical in its application but also economical and straight forward in approach and mechanism.

BACKGROUND

It is known that hydrogen can be obtained from aqueous solutions by visible light irradiation utilizing transition metal complexes or other chromophores as sensitizers. This system uses a sacrificial electron donor as the electron source. Water serves as the proton source. The following equations wherein $Ru(bipy)_3^{+2}$ is the photosensitizer, methylviologen ($MV^{+2}$) is the electron acceptor and ethylenediaminetetraacetic acid (EDTA) is the sacrificial electron donor illustrates this method:

 (1)

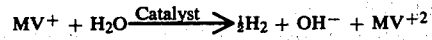

where $MV^{+2}/MV^+$ represents a possible electron relay.

In this system $MV^+$ acts upon water in the presence of metal catalysts to afford hydrogen; however, this system requires the addition of a sacrificial electron donor such as EDTA or triethanolamine (TEOA).

It is also known that oxygen can be generated from water by an analogous method in the presence of a sacrificial water by an analogous method in the presence of a sacrificial electron acceptor. According to this method visible light is absorbed by an aqueous solution of a sensitizer such as $Ru(bipy)_3^{+3}$ in the presence of an electron acceptor such as cobalt ammine complexes. In this system $Ru(bipy)_3^{+2}$ is oxidized to $Ru(bipy)_3^{+3}$ and this respect, in the presence of a metal catalyst, oxidizes water to oxygen. Water itself serves as the electron source:

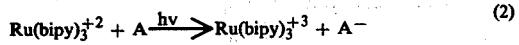 (2)

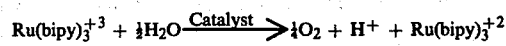

where A represents a suitable sacrificial acceptor which upon reduction is irreversibly destroyed.

In this system $Ru(bipy)_3^{+3}$ accepts an electron from water and thus regenerates the sensitizer cation $Ru(bipy)_3^{+2}$ while at the same time generating oxygen.

THE INVENTION

This invention is a combination of hydrogen and oxygen producing systems. It provides a unitary method for producing both gases simultaneously without the need for extraneous electron donors such as EDTA or TEOA or electron acceptors such as cobalt ammine complexes or thallic chloride. The ability of this process to generate oxygen in the absence of an added electron acceptor is due to the affinity of $Ru(bipy)_3^{+3}$ for the electrons generated in solution in the oxygen-producing process (1).

This discovery resulted from efforts to generate hydrogen and oxygen from water without the need for utilizing sacrificial material which renders the process less economically desirable.

The following is a description of a sacrificial oxygen producing system.

LIGHT INDUCED OXYGEN PRODUCTION

Redox catalysts mediate oxygen production from water as follows:

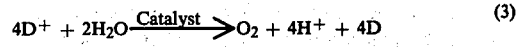 (3)

where $D^+/D$ represents a redox couple such as $Ru(bipy)_3^{+3}/Ru(bipy)_3^{+2}$. $RuO_2$ is a particularly suitable catalyst in this reaction because it has an extremely low overpotential for oxygen evolution and it is chemically stable within the pH and electrochemical potential range required for oxygen evolution:

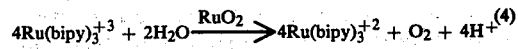 (4)

where $Ru(bipy)_3^{+3}$ is produced via the following light-induced electron transfer reaction:

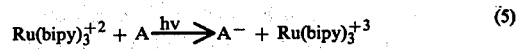 (5)

wherein A is a sacrificial acceptor of the type described above.

In the absence of a catalyst $Ru(bipy)_3^{+2}$ is irreversibly oxidized to $Ru(bipy)_3^{+3}$ according to equation 5, whereas, in the presence of a suitable catalyst such as $RuO_2$ the photoreaction becomes cyclic with respect to the sensitizer if followed by water oxidation (4).

This oxygen producing half system is illustrated by Example 1.

EXAMPLE 1. Oxygen Production

Step A: Colloidal Ruthenium Dioxide Catalyst

A neutral solution of $RuO_4$ in water (50 mg/25 ml) was mixed slowly with an equivalent amount of an aqueous solution of styrene and maleic anhydride copolymer. The pH was adjusted to 8 and the solution stirred for one hour. Under these conditions RuO$_4$ decomposed spontaneously to RuO$_2$ in a finely divided form. Aggregation did not occur due to the effect of the protective colloid. The RuO$_2$ content was 0.82 mg/ml and the mean particle radius was 400 Å as determined by quasi-elastic light scattering techniques.

Step B: Oxygen Production

The colloidal ruthenium dioxide catalyst (0.3 mg/150 ml) prepared according to Step A was placed in a flask and to this mixture was added ruthenium tris bipyridyl chloride (4×10$^{-5}$M) and the cobalt complex Co(NH$_3$)$_5$Cl (1×10$^{-2}$M). The pH of the mixture was adjusted to 2.

Prior to illumination the system was deaerated by flushing with nitrogen. The flask was then closed and subjected to illumination for 15 minutes using a 250 watt slide projector lamp.

During irradiation the pH of the cobalt complex solution increased resulting in the formation of hydroxides in the form of a brown precipitate. The addition of a buffer served to prevent the formation of these unwanted hydroxides. There was thus obtained 0.25 ml. of oxygen gas.

The following is a description of a sacrificial hydrogen producing system:

LIGHT INDUCED HYDROGEN PRODUCTION

The reduction of water to hydrogen proceeds via a reducing species A$^-$:

$$A^- + H_2O \rightarrow \tfrac{1}{2}H_2 + OH^- + A \qquad (6)$$

where the reducing species A$^-$ can be represented by the reduced form of methylviologen (MV$^+$). This reduction requires a suitable catalyst of the type discussed hereinbelow in order to effectively generate hydrogen gas from solution:

$$2MV^+ + 2H_2O \xrightarrow{\text{Catalyst}} 2MV^{+2} + H_2 + 2OH^- \qquad (7)$$

where MV$^+$ is produced from methylviologen, MV$^{+2}$, by a lightinduced electron transfer reaction with a photosensitizer such as ruthenium tris bipyridyl cation:

$$Ru(bipy)_3^{+2} + MV^{+2} \xrightarrow{h\nu} MV^+ + Ru(bipy)_3^{+3} \qquad (8)$$

The regeneration of Ru(bipy)$_3^{+2}$ occurs by reaction with a sacrificial electron donor such as EDTA:

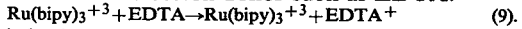

$$Ru(bipy)_3^{+3} + EDTA \rightarrow Ru(bipy)_3^{+3} + EDTA^+ \qquad (9)$$

This hydrogen producing half system is illustrated by Example 2.

EXAMPLE 2. Hydrogen Production

Step A: Colloidal Pt-PVA Catalyst

Polyvinyl alcohol (M.S.: 60,000; 2% solution) was added to H$_2$PtCl$_6$ (250 mg). This solution was neutralized with sodium hydroxide to pH 8.0 and then heated to 100° C. for half an hour with agitation. Water was added to provide a solution having a total volume of 40 cc. Hydrogen gas was then passed through the solution until it became dark gray-brown indicating that platinum deposition had taken place. The ph after reduction becomes slightly acidic.

The mixture was then subjected to centrifugation for 8 hours at 13,000 R.P.M. The supernatant contained lighter particles while the heavier particles were found in the deposit.

The Pt-PVA 60,000 catalyst thus obtained had a platinum concentration of 3.5 mg per 25 cc of solution. The diffusion rate for this catalyst was 0.73×10$^{-7}$ cm$^2$/sec and it was characterized by an R$_h$ of 320 Å. (This R$_h$ value represents the hydrodynamic radius of the combined platinum and colloid particles).

Step B: Hydrogen Production

A water solution of ruthenium tris bipyridyl chloride [Ru(bipy)$^{+2}$] 2Cl$^-$(4×10$^{-5}$M), methylviologen (MV$^{+2}$; 2×10$^{-5}$M) and ethylenediaminetetraacetic acid (EDTA; 2×10$^{-2}$M) was adjusted to pH 5.

The solution was subjected to continuous irradiation using a standard Osram XBO-450 watt lamp after removal of ultraviolet light with a 400 nm filter and after removal of infrared light by a 15 cm. water absorber cell.

To this solution was added the platinum-polyvinyl alcohol catalyst of Step A. This catalytic material contained 1 mg of platinum per 100 ml.

This catalyst mediated hydrogen evolution at a rate of 4 liters per day per liter of solution.

The hydrogen producing system of Equations 6-9 and the oxygen producing system described in Equations 3-5 are essentially two half systems. A process which combines both systems is desirable because it would provide a means for splitting water into hydrogen and oxygen gas simultaneously while at the same time regenerating essential starting materials.

SIMULTANEOUS HYDROGEN AND OXYGEN PRODUCTION

The hydrogen and oxygen producing systems described above are in reality two half systems.

This invention combines the half systems hereinbefore described into a unitary process for generating hydrogen and oxygen simultaneously using the water substrate not only as the source for hydrogen and oxygen but, also, as the electron source for the hydrogen producing half system.

The present system achieves this result by combining hydrogen and oxygen producing redox catalysts in a manner which could not have been expected in a cyclic process. This process is illustrated by the following equations in which the sensitizer S(D) is bifunctional because of its ability to function both as sensitizer and as an electron donor. It is a sensitizer because it absorbs visible light to afford the electronically excited state and it is an electron donor because the said excited state reduces the electron relay A to A.

The electron relay is such that it undergoes a rapid succeeding reaction to its oxidized state upon reducing water to hydrogen while simultaneously the oxidized sensitizer is reconverted to its renewed form upon generating oxygen from water. Selective catalysts are required for both the hydrogen and oxygen generating steps.

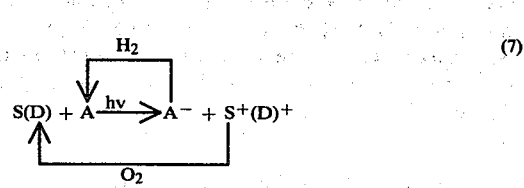

(7)

where S, S+, D, D+, A and A− are as defined above.

Photosensitizers which may be used in this process include, in addition to ruthenium tris bipyridyl cation, water soluble pyridinium metallo porphyrines such as water soluble pyridinium zinc porphyrine and metallo phthalocyanines such as sulfonated zinc phthalocyanine. These compounds are photoexcitable electron donors; however, as indicated below non-photoexcitable reagents such as ferrous tris bipyridyl cation and ferrous tris phenanthroline cation may also be employed if combined with an electron relay which can be converted to its photoexcited state.

For the photosensitizer to function both as a sensitizer (S) and as an electron donor (D), it is essential that said reagent be selectively paired with a suitable electron relay. Thus, for example, when the electron donor (D) is one which is capable of photoexcitation to its excited state S*, then it may be paired with an electron relay (A) which is not photoexcitable, that is, it is dormant.

On the other hand, when the electron donor (D) cannot be converted by irradiation to its excited state S* then it is essential that the acceptor molecule be capable of achieving this molecularly excited state.

Suitable sensitizer-acceptor pairings which may be utilized in this manner are set forth in Table I below although they are by no means exclusive:

TABLE I

| Excitable Donors | Dormant Acceptors |
|---|---|
| Ruthenium tris bipyridyl cation | Methylviologen |
| Zinc N—tetramethyl-pyridinium porphyrine | Chromic, vanadic or europic ion and salicylate or macrocyclic complexes thereof |
| Phthalocyanine | Crown ether cobaltous complexes |
| Dormant Donors | Excitable Acceptors |
| Ferrous tris bipyridyl cation | Proflavine |
| Ferrous tris ortho-phenanthroline cation | Thionine |

CATALYSTS

To mediate the oxygen and hydrogen producing processes very active catalysts were employed. The production of hydrogen was mediated by the addition of metal catalysts of the platinum group. Typical of these catalysts are platinum, palladium, rhodium, ruthenium, iridium, osmium, silver, gold and the oxides thereof in either powdered form or as colloids and mixtures thereof. Finely dispersed colloids are particularly effective and the preparation of this subgroup of catalysts is described in copending application Ser. No. 184,673 filed on even date. A finely dispersed platinum catalyst was particularly useful in catalyzing hydrogen formation.

In mediating the oxygen-producing system ruthenium, platinum and iridium in oxide form or other transition metal oxides as, for example, the oxide of manganese, iron, cobalt, tantalum or titanium such as di-tantalum pentoxide, titanium dioxide and the like and mixtures thereof may be employed. These agents may be used either as colloids or as powders but the colloidal forms are preferred. A finely dispersed mixture of ruthenium dioxide and titanium dioxide was particularly advantageous in catalyzing oxygen formation. Applicants do not attempt to explain the precise interaction which occurs but it appears that the oxygen and hydrogen producing catalysts such as $RuO_2$ and Pt, respectively, in dispersed form act as microelectrodes. In this system the ruthenium dioxide serves as the anode for oxygen evolution and platinum serves as the cathode for water reduction to hydrogen. The heterogeneous electron transfer rates on one or the other particles seem to differ sufficiently to avoid short circuiting of the back reaction. Also, the charge transfer from the reduced electron relay A− to the Pt particle can compete sufficiently with the cross-reaction:

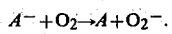

$$A^- + O_2 \rightarrow A + O_2^-.$$

Platinum is a metal catalyst belonging to the class of metals which adsorbs hydrogen well and it has very high current density values.

Electron transfer from A− to the Pt particle tunes them cathodically until hydrogen formation takes place. Periodic variations of hydrogen overpotential with atomic number are evident both in acid and alkaline solutions.

On the other hand, oxygen evolution can occur on ruthenium oxide particles with minimum energy loss because this material is distinguished by a low anodic overpotential for oxygen evolution.

The dispersity of the catalysts is an important factor controlling the oxygen and hydrogen evolution rates. A smaller catalyst size is advantageous both from the point of view of mass transport of the electroactive species as well as surface area per gram of catalyst employed.

pH Levels

The rates of oxygen and hydrogen evolution are dependent upon the pH at which the reaction is conducted. High yields of oxygen are most conveniently obtained by operating at pH levels of from about 3–8 but, preferably, between about 4–5. Identical pH levels also promote the conversion of $Ru(bipy)_3^{+2}$ to $Ru(bipy)_3^{+3}$ with a consequent evolution of hydrogen gas.

Temperature is not particularly critical to the reaction and, accordingly, for ease of operation the process is most conveniently conducted at ambient temperature.

To illustrate this invention, hydrogen and oxygen gas were generated simultaneously from a system which contained ruthenium tris bipyridyl cation as a sensitizer and dimethylviologen as an acceptor.

EXAMPLE 3. Hydrogen and Oxygen Production

Colloidal ruthenium dioxide catalyst (1mg/150 ml) prepared as described in Example 1, Step A, and colloidal Pt catalyst stabilized by styrene-maleic anhydride copolymer (3 mg/100 ml) prepared as described in Example 2, Step A, were added to a solution of ruthenium tris bipyridyl chloride $[Ru(bipy)_3^{+2}] 2Cl^-$ ($10^{-4}$M) and methylviologen ($MV^{+2}$; $2 \times 10^{-3}$M). The mixture (150 ml) was adjusted to a pH of 4.7.

The colloidal platinum catalyst used in this experiment was prepared by following the procedure described in Example 1 by substituting a 0.5% solution of the copolymer of styrene and maleic anhydride for the 2.0% polyvinyl alcohol (PVA) solution therein described.

The mixture was subjected to irradiation with a 250 watt slide projector lamp for 3 hours. Upon irradiation an evolution of gas occured which was qualitatively and quantitatively analyzed. There was thus obtained 0.3 ml oxygen and 0.6 ml hydrogen.

Blank experiiments were conducted and these showed that the presence of finely dispersed ruthenium dioxide and PtPVA are both essential for hydrogen and oxygen production.

If colloidal Pt-styrene maleic anhdyride is employed alone, Ru(bipy)$_3^{+2}$ is depleted rapidly under illumination. No oxygen and inconsequential amounts of hydrogen were produced.

Where both catalysts are employed the depletion of Ru(bipy)$_3^{+2}$ during 3 hours of irradiation was less than 5%. The turnover number of the Ru(bipy)$_3^{+2}$ is at least 100, illustrating the cyclic nature of the photolysis reaction.

The procedure of Example 3 was repeated substituting powdered ruthenium dioxide (50 mg/150 ml) for the colloidal form of said catalyst but otherwise following the procedure therein described. There was thus obtained 0.3 ml oxygen and 0.6 ml hydrogen after 3 hours of illumination of a 150 ml solution. These results indicate the greater effectiveness of the colloidal ruthenium dioxide catalyst inasmuch as only 1/50th the amount of said catalyst was required to obtain an equivalent amount of product as was obtained when using ruthenium dioxide in powdered form.

The following equation illustrates the reaction mechanism of Example 3:

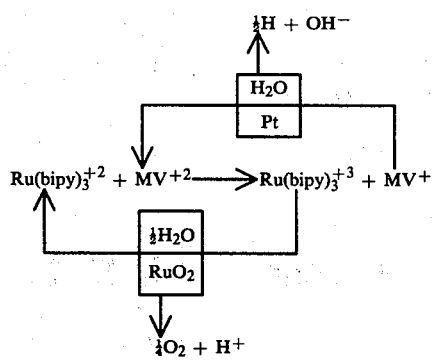

The following example illustrates the co-production of hydrogen and oxygen gas utilizing a catalyst system different from that of Example 3.

EXAMPLE 4: Hydrogen and Oxygen Production

The ruthenium catalyst in this system is a mixture of ruthenium dioxide (0.1% RuO$_2$ by weight) and n-type titanium dioxide (Nd doped). This material has a grain diameter size of 1000–2000 Å and serves as a carrier for finely divided platinum (25–35Å); it is prepared according to the method described in copending application Ser. No. 184,610. The absorption of platinum by the ruthenium dioxide-titanium dioxide (RuO$_2$-TiO$_2$) particles was accomplished by contacting a colloidal suspension containing 40 mg Pt/liter with a suspension of the RuO$_2$-TiO$_2$ particles (500 mg/liter) for one hour. In this manner, particles are formed which can perform the function of both oxidation and reduction catalysts.

The successful operation of this system in generating hydrogen and oxygen from water under the action of visible light was demonstrated as follows: To the catalyst suspension was added ruthenium tris bipyridyl chloride [Ru(bipy)$_3^{2+}$] 2Cl$^-$(10$^{-4}$M) and methylviologen (MV$^{+2}$; 5×10$^{-3}$M). The mixture (50 ml) was adjusted to pH 4.7 and then subjected to irradiation with a 250 watt halogen lamp. Light from the lamp was filtered through a 15 cm water jacket and a 4 nm cutoff filter to eliminate the effects of infrared and ultraviolet illumination.

Initially, the hydrogen evolution rate observed under illumination was 120 ml/liter per hour. Concurrently, oxygen was evolved at a rate of 48 ml/liter per hour. This value which is below the stoichiometric ratio is attributed to oxygen retention by the catalyst; however, over an extended period the stoichiometric ratio of 1 mole of oxygen and 2 moles of hydrogen was achieved.

This experiment illustrates the sustained evolution of hydrogen and oxygen over extended periods. Thus, after 18 hours of irradiation the hydrogen generated was eighteen times greater than that which was formed in the first hour of irradiation.

In the absence of a catalyst or sensitizer relay couple no hydrogen or oxygen evolution was observed.

What is claimed is:

1. A unitary method for simultaneous production of hydrogen and oxygen from water by photolytic means in the absence of extraneous sacrificial electron donors or electron acceptors which comprises irradiating an aqueous mixture containing a photosensitizer and an electron relay with visible light, one of said photosensitizer and said electron relay functioning as an electron donor and the other as an electron acceptor while simultaneously mediating production with a hydrogen-generating catalyst and an oxygen generating catalyst, whereby catalyst-mediated electron transfer among the photosensitizer, electron relay and water produces hydrogen and oxygen and effects cyclic regeneration of said photosensitizer and electron relay.

2. A method according to claim 1 wherein the photosensitizer functions as an electron donor and the electron relay functions as an electron acceptor.

3. The method according to claim 2 wherein the photosensitizer is selected from ruthenium tris bipyridyl cation, water soluble pyridinium metallo porphyrine and metallo phthalocyanine; the electron relay is selected from methylviologen, chromic ion, europic ion, vanadic ion and the salicylate or crown ether complexes of said ions and macrocyclic cobaltous complexes.

4. The method according to claim 3 wherein the photosensitizer is ruthenium tris bipyridyl cation and the electron relay is methylviologen.

5. The method according to claim 1 wherein the photosensitizer functions as an electron acceptor and the electron relay functions as an electron donor.

6. The method according to claim 5 wherein the photosensitizer is selected from proflavine and thionine and the electron relay is selected from ferrous tris bipyridyl cation or ferrous tris ortho-phenanthroline cation.

7. The method according to claim 1 wherein the hydrogen generating catalyst is a finely divided metal selected from platinum, palladium, rhodium, iridium, ruthenium, osmium, silver or gold, the oxides thereof or mixtures of same in dispersed form.

8. The method according to claim 7 including the step of dispersing the hydrogen generating catalyst in said aqueous mixture in a stabilized colloidal form.

9. The method according to claim 7 wherein a water permeable protective agent is employed to maintain the said catalyst in finely dispersed form.

10. The method according to claim 1 wherein the oxygen generating catalyst is an oxide of ruthenium, platinum, iridium, manganese, iron, cobalt, tantalum or titanium or mixtures thereof in finely divided form.

11. The method according to claim 10 wherein the catalyst is a mixture of ruthenium dioxide and titanium dioxide.

12. The method according to claim 10 wherein the ruthenium dioxide is in the form of a stabilized colloid.

13. The method according to claim 1 wherein the oxygen generating catalyst is colloidal ruthenium dioxide and the hydrogen generating catalyst is colloidal platinum.

14. The method according to claim 1 wherein the oxygen generating catalyst is a mixture of ruthenium dioxide and titanium dioxide and the hydrogen generating catalyst is finely divided platinum.

15. The method according to claim 1 for the preparation of hydrogen and oxygen which comprises irradiating with visible light an aqueous mixture of ruthenium tris bipyridyl chloride and methylviologen in the presence of a mixture of ruthenium dioxide and titanium dioxide and finely divided platinum.

16. A photochemical system for simultaneous production of hydrogen and oxygen from water by photolytic means comprising, in combination, an aqueous mixture of a photosensitizer and an electron relay, one of which functions as an electron donor and the other functions as an electron acceptor, a hydrogen generating catalyst, an oxygen generating catalyst, and means for irradiating said aqueous mixture with visible light to initiate electron transfer among said photosensitizer, electron relay and water to obtain the desired products and to effect regeneration of said photosensitizer and electron relay.

17. The system according to claim 16 wherein the photosensitizer functions as an electron donor and the electron relay functions as an electron acceptor.

18. The system according to claim 17 wherein the photosensitizer is selected from ruthenium tris bipyridyl cation, water soluble pyridinium metallo porphyrine and metallo phthalocyanine; the electron relay is selected from methylviologen, chromic ion, europic ion, vanadic ion and the salicylate or crown ether complexes of said ions and macrocyclic cobaltous complexes.

19. The system according to claim 18 wherein the photosensitizer is ruthenium tris bipyridyl cation and the electron relay is methylviologen.

20. The system according to claim 16 wherein the photosensitizer functions as an electron acceptor and the electron relay functions as an electron donor.

21. The system according to claim 20 wherein the photosensitizer is selected from proflavine and thionine and the electron relay is selected from ferrous tris bipyridyl cation or ferrous tris ortho-phenanthroline cation.

22. The system according to claim 16 wherein the hydrogen generating catalyst is a finely divided metal selected from platinum, palladium, rhodium, iridium, ruthenium, osmium, silver or gold, the oxides thereof or mixtures of same in dispersed form.

23. The system according to claim 22 including the step of dispersing the hydrogen generating catalyst in said aqueous mixture in a stabilized colloidal form.

24. The system according to claim 22 wherein a water permeable protective agent is employed to maintain the said catalyst in finely dispersed form.

25. The system according to claim 16 wherein the oxygen generating catalyst is an oxide of ruthenium, platinum, iridium, manganese, iron, cobalt, tantalum or titanium or mixtures thereof in finely divided form.

26. The system according to claim 25 wherein the catalyst is a mixture of ruthenium dioxide and titanium dioxide.

27. The system according to claim 25 wherein the ruthenium dioxide is in the form of a stabilized colloid.

28. The system according to claim 16 wherein the oxygen generating catalyst is colloidal ruthenium dioxide and the hydrogen generating catalyst is colloidal platinum.

29. The system according to claim 16 wherein the oxygen generating catalyst is a mixture of ruthenium dioxide and titanium dioxide and the hydrogen generating catalyst is finely divided platinum.

30. The system according to claim 16 for the preparation of hydrogen and oxygen which comprises irradiating with visible light an aqueous mixture of ruthenium tris bipyridyl chloride and methylviologen in the presence of a mixture of ruthenium dioxide and titanium dioxide and finely divided platinum.

* * * * *

UNITED STATES PATENT AND TRADEMARK OFFICE
CERTIFICATE OF CORRECTION

PATENT NO. : 4,382,846

DATED : May 10, 1983

INVENTOR(S) : Michael Gratzel, John Kiwi, Kuppuswamy Kalyanasundaram and John Philp It is certified that error appears in the above-identified patent and that said Letters Patent are hereby corrected as shown below:

On cover page, under [30] Foreign Application Priority Data, delete [Aug. 9, 1979] and [Aug. 7, 1980] and replace with --Sept. 8, 1979-- and --July 8, 1980--, respectively.

Signed and Sealed this

Eighteenth Day of September 1984

[SEAL]

Attest:

GERALD J. MOSSINGHOFF

Attesting Officer

Commissioner of Patents and Trademarks